United States Patent
Barnett et al.

(10) Patent No.: US 6,662,187 B2
(45) Date of Patent: Dec. 9, 2003

(54) ESTABLISHMENT AND MAINTENANCE OF A MANAGED COMMUNITY

(75) Inventors: Janet Arlie Barnett, Pattersonville, NY (US); Barbara Jean Vivier, Niskayuna, NY (US); Kareem Sherif Aggour, Schenectady, NY (US); Mark Mitchell Kornfein, Latham, NY (US); Osman Rifki Oksoy, Clifton Park, NY (US); Bassel Omari Williams, Albany, NY (US)

(73) Assignee: General Electric Company, Niskayuna, NY (US)

( * ) Notice: Subject to any disclaimer, the term of this patent is extended or adjusted under 35 U.S.C. 154(b) by 277 days.

(21) Appl. No.: 09/760,998

(22) Filed: Jan. 16, 2001

(65) Prior Publication Data

US 2002/0095398 A1 Jul. 18, 2002

(51) Int. Cl.$^7$ .............................................. G06F 17/30
(52) U.S. Cl. ........................... 707/101; 709/10; 709/9; 709/3
(58) Field of Search .............................. 707/3, 4, 5, 9, 707/10, 101, 100

(56) References Cited

U.S. PATENT DOCUMENTS

| | | |
|---|---|---|
| 5,996,007 A | 11/1999 | Klug et al. |
| 6,029,161 A | 2/2000 | Lang et al. |
| 6,029,192 A * | 2/2000 | Hill et al. ................. 709/206 |
| 6,038,560 A | 3/2000 | Wiscal |
| 6,339,767 B1 * | 1/2002 | Rivette et al. .............. 707/2 |
| 2002/0143605 A1 * | 10/2002 | Holland et al. ............. 705/10 |

OTHER PUBLICATIONS

Oblix NetPoint 4.0 [online]. Oblix, Inc. [retrieved on Dec. 18, 2000]. Retrieved from the Internet:<URL: http://www.oblix.com/products_and_solutions/netpoint/>.

Securant Products [online]. Securant Technologies [retrieved on Dec. 18, 2000]. Retrieved from the Internet:<URL: http://www.securant.com/ie/main_products.html>.

Delegated Management Services [online]. Netegrity, Inc. [retrieved on Dec. 18, 2000]. Retrieved from the Internet:<URL: http://www.netegrity.com/products/dms.html>.

iPlanet Delegated Administrator 4.5 Datasheet [online]. iPlanet International [retrieved on Dec. 18, 2000]. Retrieved from the Internet:<URL: http://iplanet.com/products/infrastructure/dir_security/del_admin/>.

* cited by examiner

Primary Examiner—Jean M. Corrielus
(74) Attorney, Agent, or Firm—David C. Goldman; Patrick K. Patnode

(57) ABSTRACT

Establishment and maintenance of a managed community. In this disclosure there is an approach and tool that enables an administration tool to manage communities whose information resides in separate and differently structured directories and databases. In addition, this disclosure describes an approach and tool that enables an administration tool to establish information to be managed from the broad range of directories and databases, which includes defining information that is to be managed and information that is not to be managed and the discovering of new information to manage.

77 Claims, 7 Drawing Sheets

ESTABLISHMENT AND MAINTENANCE OF A MANAGED COMMUNITY

BACKGROUND OF THE INVENTION

This disclosure relates generally to a community and more particularly to establishing and maintaining information needed to manage a community.

Generally, a community is a group of people who typically share a common interest. With the advent of the Internet and e-commerce, many companies are forming communities through intranets and extranets, for employees, suppliers, partners and clients. The communities make it easier and less expensive for the employees, suppliers, partners and clients to work together. In the context of computer services, these people are known as computer users or simply users. Information on each of the users in the communities is stored in a broad range of directories and databases. The information may comprise items such as the user's name, location, telephone number, organization, login identification, password, etc. Other information may comprise the user's access privileges to resources such as applications and content. The directories and databases may also store information on the physical devices (e.g., personal computers, servers, printers, routers, communication servers, etc.) in the networks that support the communities. Additional information may comprise the services (e.g., operating systems, applications, shared-file systems, print queues, etc.) available to each of the physical devices.

An administration tool typically manages all of the information associated with the community. A problem facing most administration tools is that the directories or databases that store the information can have structures that vary significantly from each other. Most commercially available administration tools do not have the capability to manage information stored in a broad range of directories and databases. Consequently, administrators of communities that store information in different directories and databases often have to use more than one administration tool to manage the information because a single tool is unable to locate, identify and characterize information that varies in structure and content. For example, suppose that an organization stores customer information in a directory such as a lightweight directory access protocol (LDAP) directory and information on software that the organization licenses in a database; an administrator would have to use more than one administration tool to manage both communities because the information varies in structure and content. Therefore, there is a need for an approach that can enable an administration tool to manage different communities whose information resides in separate and differently structured directories and databases.

Another problem with having community information stored in a broad range of directories and databases is that it is difficult for currently available administration tools to establish information to be managed from the directories and databases. Generally, data stored in directories and databases include a wide variety of information. Some of the data (e.g., name, address, etc.) are managed by a user, while some data (e.g., user and resource characteristics) are managed by an administrator. Typically, there is a great deal of other data that are often automatically associated with a user that do not have to be managed by an administrator. Other data that do not have to be managed by an administrator include unused or automatically updated data fields in the directories and databases. In order to manage a community, it is desirable to carve out a subset of the directory or database data to be managed and to explicitly ignore the rest. Also, as directories and databases change in structure, it is desirable to discover those changes and to decide whether or not to manage any new data elements. Therefore, there is a need for an approach that can enable an administration tool to establish information to be managed from the directories and databases, which includes defining information that is to be managed and information that is not to be managed and the discovering of new information to manage.

BRIEF SUMMARY OF THE INVENTION

In one embodiment of this disclosure, there is a method, system and computer readable medium that stores instructions for instructing a computer system to establish information needed to manage a community. In this embodiment, at least one data repository containing data related to the community is identified. The structure of the data within the at least one data repository is discovered. Data objects and attributes within the objects are selected from the discovered structure for managing. Access permissions for managing the selected attributes are defined.

In a second embodiment of this disclosure, there is a system, method and computer readable medium that stores instructions for instructing a computer system to enable an administrator to establish information needed to manage a community. In this embodiment, at least one data repository containing data related to the community is identified. The structure of the data within the at least one data repository is discovered. The administrator is prompted to select data objects and attributes within the objects from the discovered structure and to define access permissions for managing the selected attributes.

In another embodiment, there is a tool for establishing information needed to manage a community. The tool comprises a data repository identification component that identifies at least one data repository containing data related to the community. A data structure discovery component discovers the structure of the data within the at least one data repository. A data selection component selects data objects and attributes within the objects according to the structure discovered by the data structure discovery component. An access permissions component defines access permissions for managing the attributes selected by the data selection component.

In still another embodiment, there is a system for establishing information needed to manage a community. This system comprises at least one data repository containing a plurality of community information. A tool establishes information in the at least one data repository to manage the community. The tool comprises a data repository identification component that identifies the least one data repository containing data related to the community. A data structure discovery component discovers the structure of the data within the at least one data repository A data selection component selects data objects and attributes within the objects according to the structure discovered by the data structure discovery component. An access permissions component defines access permissions for the managing attributes selected by the data selection component. A computing unit is configured to serve the tool.

DETAILED DESCRIPTION OF THE INVENTION

In this disclosure, there is a description of an approach that overcomes the problems associated with managing community information stored in a broad range of directories and databases with currently available administrative tools. In particular, this approach facilitates the creation, configuration and subsequent modification of a managed community so that currently available administrative tools can manage the community without regard to the structure and content of information associated with the community. In this approach, the configuration of the managed community includes discovering information or data associated with the community that are stored in data repositories such as directories and databases and that are to be potentially managed. The configuration also includes user interaction to identify specific data elements or attributes that are to be managed and attributes that are not to be managed. The processes used in the configuration can also be used in subsequent modifications or updates to the managed community. The same processes used in the creation, configuration and modification of a managed community can be used to manage multiple independent communities.

Figure 1:
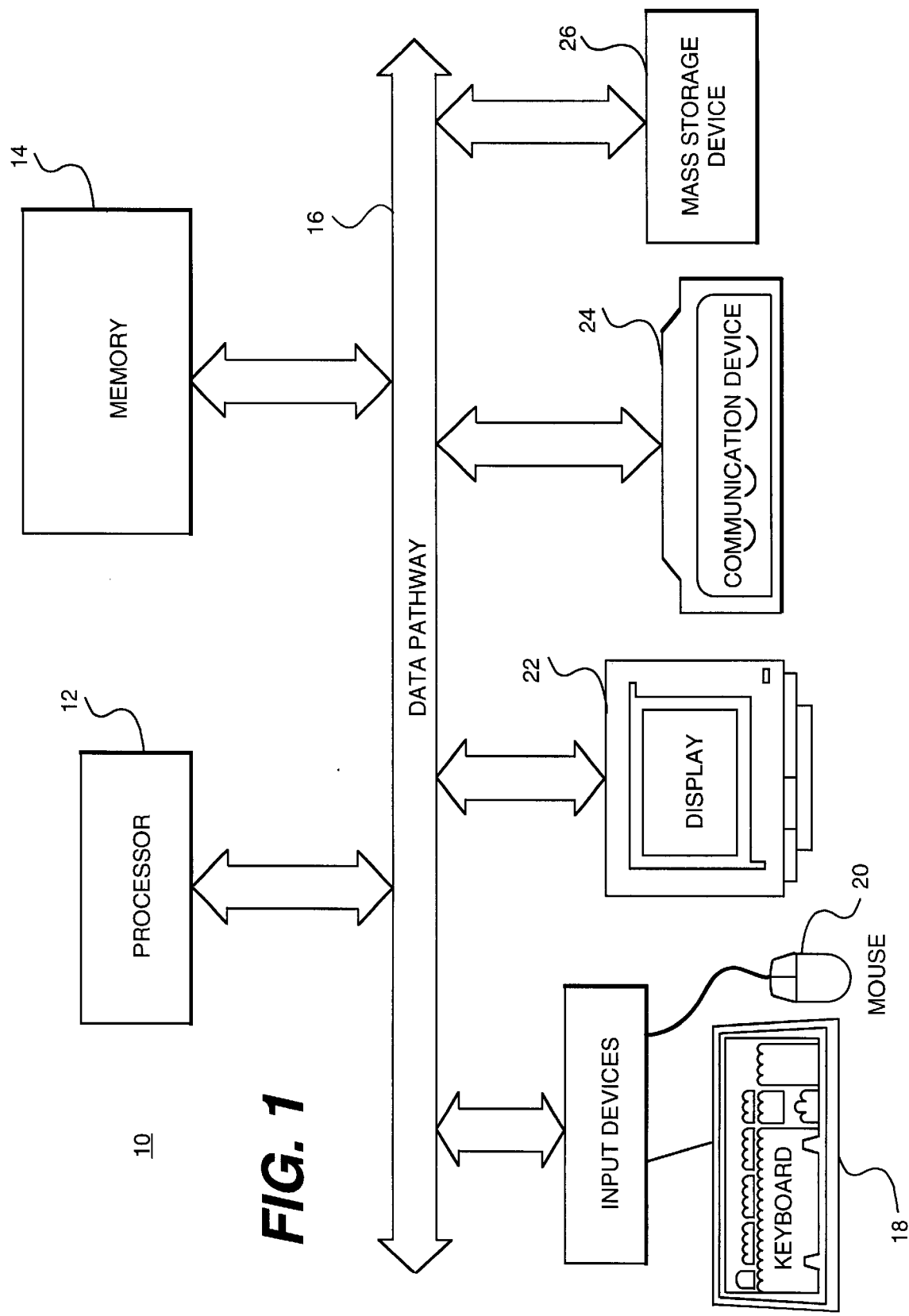
FIG. 1 shows a schematic of a general-purpose computer system in which a tool that establishes information needed to manage a community operates.

As an example, this approach for creating, configuring and modifying a managed community can be implemented in software. FIG. 1 shows a schematic of a general-purpose computer system 10 in which a tool that establishes information needed to manage a community operates. The computer system 10 generally comprises at least one processor 12, a memory 14, input/output devices, and data pathways (e.g., buses) 16 connecting the processor, memory and input/output devices. The processor 12 accepts instructions and data from the memory 14 and performs various calculations. The processor 12 includes an arithmetic logic unit (ALU) that performs arithmetic and logical operations and a control unit that extracts instructions from memory 14 and decodes and executes them, calling on the ALU when necessary. The memory 14 generally includes a random-access memory (RAM) and a read-only memory (ROM); however, there may be other types of memory such as programmable read-only memory (PROM), erasable programmable read-only memory (EPROM) and electrically erasable programmable read-only memory (EEPROM). Also, the memory 14 preferably contains an operating system, which executes on the processor 12. The operating system performs basic tasks that include recognizing input, sending output to output devices, keeping track of files and directories and controlling various peripheral devices.

The input/output devices may comprise a keyboard 18 and a mouse 20 that enter data and instructions into the computer system 10. Also, a display 22 may be used to allow a user to see what the computer has accomplished. Other output devices may include a printer, plotter, synthesizer and speakers. A communication device 24 such as a telephone or cable modem or a network card such as an Ethernet adapter, local area network (LAN) adapter, integrated services digital network (ISDN) adapter, or Digital Subscriber Line (DSL) adapter, that enables the computer system 10 to access other computers and resources on a network such as a LAN or a wide area network (WAN). A mass storage device 26 may be used to allow the computer system 10 to permanently retain large amounts of data. The mass storage device may include all types of disk drives such as floppy disks, hard disks and optical disks, as well as tape drives that can read and write data onto a tape that could include digital audio tapes (DAT), digital linear tapes (DLT), or other magnetically coded media. The above-described computer system 10 can take the form of a hand-held digital computer, personal digital assistant computer, notebook computer, personal computer, workstation, mini-computer, mainframe computer or super-computer.

Figure 2:
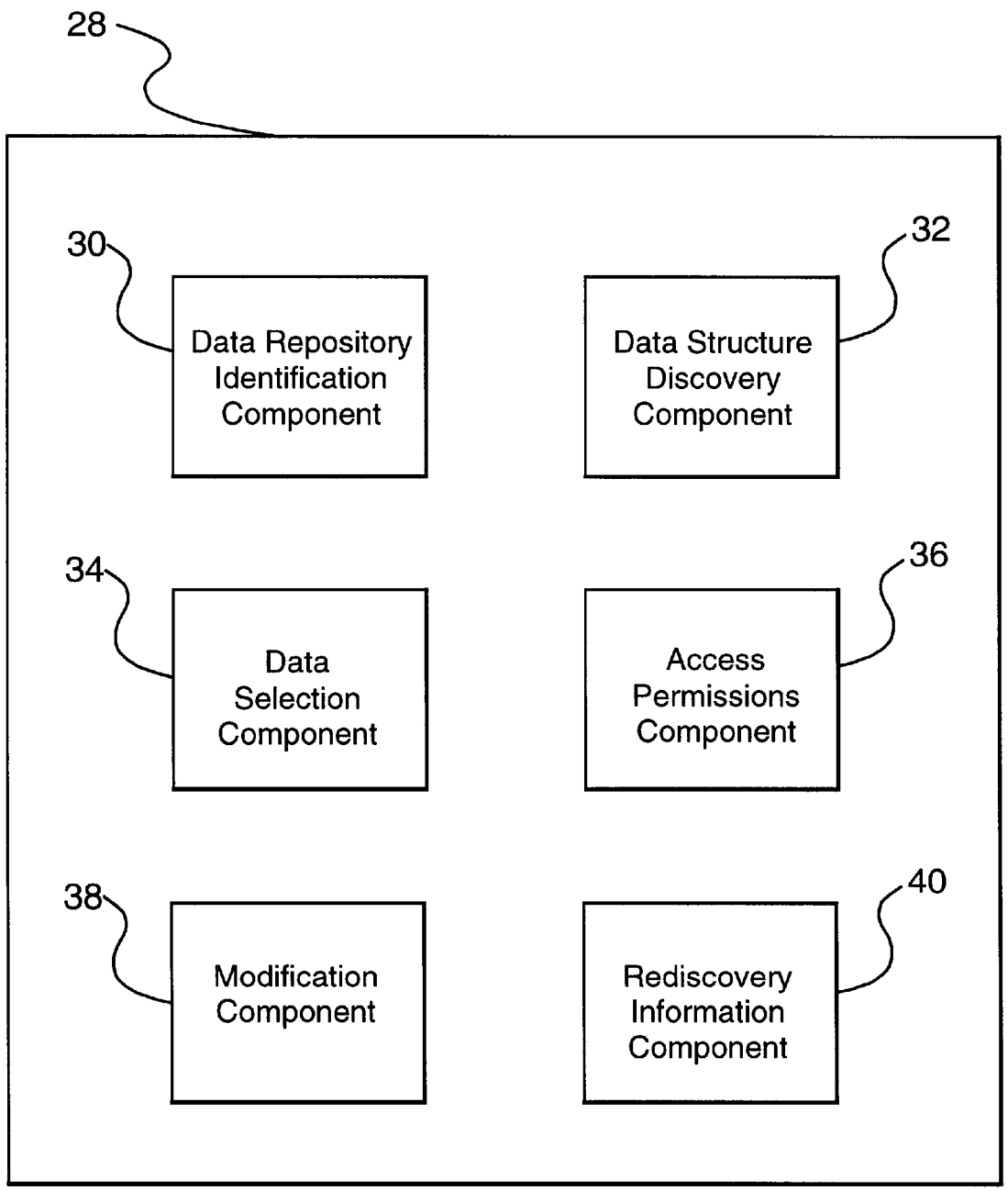
FIG. 2 shows a top-level component architecture diagram of a tool that establishes information needed to manage a community and that operates on the computer system shown in FIG. 1.

FIG. 2 shows a top-level component architecture diagram of a tool 28 that establishes information needed to manage a community and that operates on the computer system 10 shown in FIG. 1. Generally, a top-level administrator uses the tool 28 and in this disclosure is referred to as a Super-Administrator. Some functions that the SuperAdministrator typically performs comprise installing the software tool described in this disclosure, configuring the installation to connect to one or more data repositories, identifying the data to be managed, identifying data to be self-managed and assigning selected users to manage the data previously selected. The tool 28 comprises a data repository identification component 30 that identifies at least one data repository containing data related to the user community. The at least one data repository that the data repository identification component 30 identifies may comprise a multiple of repositories that have different structures. The data repository identification component 30 also determines connection information for accessing data stored within the at least one data repository. Examples of connection information include but are not limited to the server that provides access to the at least one data repository, the port that interfaces with the at least one repository, a login identification for the at least one repository and the password for accessing the at least one repository.

A data structure discovery component 32 discovers a structure of the data within the at least one data repository. In particular, the data structure discovery component 32 determines the data objects and attributes that exist within the at least one data repository. Typically, standard database queries are performed to first determine what data objects are defined within the at least one data repository. After the SuperAdministrator selects those data objects that comprise a managed user, then further queries are made to find out which attributes are associated with those objects.

The SuperAdministrator uses a data selection component 34 to select data objects and attributes discovered by the data structure discovery component 32. In particular, the Super-Administrator decides which objects and attributes that were discovered shall be managed. Not all of the objects and classes that are discovered need to be managed. The selection of which objects and attributes are to be managed within the community is left to the discretion of the SuperAdministrator. Typically, the selection will vary from one community to a next. The SuperAdministrator also uses the data selection component 34 to identify attributes from the discovered objects and attributes that are unused within the managed user community. For example, attributes such as those that capture the state of the system that is used to implement the tool 28 and those that track times and dates of events in the system should not be altered by an administrator of the community. Other examples of attributes that should not be managed include internally generated data that should not be edited or viewed directly or data fields that are simply unused or are never changing. For such attributes, the SuperAdministrator uses the data selection component 34 to identify these attributes so that they will not be managed within community.

The SuperAdministrator uses an access permissions component 36 to define access permissions for managing the attributes selected by the data selection component 34. The access permissions defined by the SuperAdministrator determine how an administrator for a particular community can act upon certain attributes. In particular, the access permissions define what types of operations an administrator can and cannot perform on the attributes defined in a community. Some operations that the SuperAdministrator can grant include viewing, editing and deleting the attributes. These administrative operations are illustrative of only a few operations that the SuperAdministrator can grant access permission to and are not exhaustive of other possibilities. Examples of some other administrative operations that can be granted are editing during a particular time period and resetting data fields to default values. In general, the SuperAdministrator can use the access permissions component 36 to grant or deny access permission for any of these operations in order to restrict what can and cannot be done to the attributes. Selection of access permissions for the attributes is left to the SuperAdministrator. Note that it is possible to grant access permission for just one of the above operations or any combination of the operations.

The access permissions component 36 also allows the SuperAdministrator to specify restricted values for some of the selected attributes. For example, for an attribute that contains data on the state that a user is employed (e.g., State of Employment), values can be restricted to one of 50 possible values; wherein the values are limited to two letter abbreviations (e.g., WI, NY, etc.). Another example where values can be restricted for an attribute, is for an attribute that lists applications that a user has access to. In this example, values for this application attribute may be restricted to specific names such as Catalog, Auction, Email, Chat, Web, etc. In addition, it is possible that some user attributes will have similar restricted values. Furthermore, it is possible to use a set of specified restricted attributes across a multiple of data repositories.

A modification component 38 allows the SuperAdministrator to make modifications or updates to the initial configuration of the community. In particular, the SuperAdministrator can use the modification component 38 to make changes to connection information for the at least one data repository such as server, port, login identification and password information. Also, modifications can be made to the data objects and attributes that were selected earlier for managing. This also includes making modifications to the attributes that were identified as unused within the managed community. Furthermore, the modification component 38 can be used to make modifications to the access permissions defined for the attributes, as well as the restricted values that were specified for the attributes.

A rediscovery information component 40 enables the SuperAdministrator to rediscover information about the structure of the data within the at least one data repository at a subsequent time after the community is up and running. Generally, after the initial discovery, the at least one data repository may have had additional attributes defined and thus might necessitate a rediscovery. For example, some older repositories may not contain attributes to store e-mail addresses or fax numbers or personal home page references. If those attributes are added to the at least one repository, then it is desirable to perform a rediscovery of this information and include them as managed attributes. Also, it may be desirable to perform a rediscovery anytime that changes have been made to the underlying data repository in order to have an accurate view of the repository.

To rediscover object classes and attributes, the rediscovery information component 40 searches the at least one data repository for the object classes and attributes. The SuperAdministrator uses the rediscovery information component 40 to select additional objects and attributes to be managed. If any of the new attributes are useless to the managing of the community, then the SuperAdministrator identifies them as unmanaged. The SuperAdministrator then determines the access permissions for the new attributes that were selected, as well as any restricted values that should be designated for the attributes.

The tool 28 is not limited to a software implementation. For instance, the data repository identification component 30, data structure discovery component 32, data selection component 34, access permissions component 36, modification component 38 and rediscovery information component 40 may take the form of hardware or firmware or combinations of software, hardware, and firmware.

In addition, the tool 28 is not limited to the data repository identification component 30, data structure discovery component 32, data selection component 34, access permissions component 36, modification component 38 and rediscovery information component 40. One of ordinary skill in the art will recognize that the tool 28 may have other components. For example, the tool 28 could also include a workflow component that manages processes surrounding user creation and administration. Also, the tool 28 could include a reporting component that reports usage statistics, error conditions, etc. There could also be a transactional management component that performs transactions using 2-phase commit/rollback. Still another component that the tool 28 could include is a browsing component for viewing information associated with the community.

Figure 3:
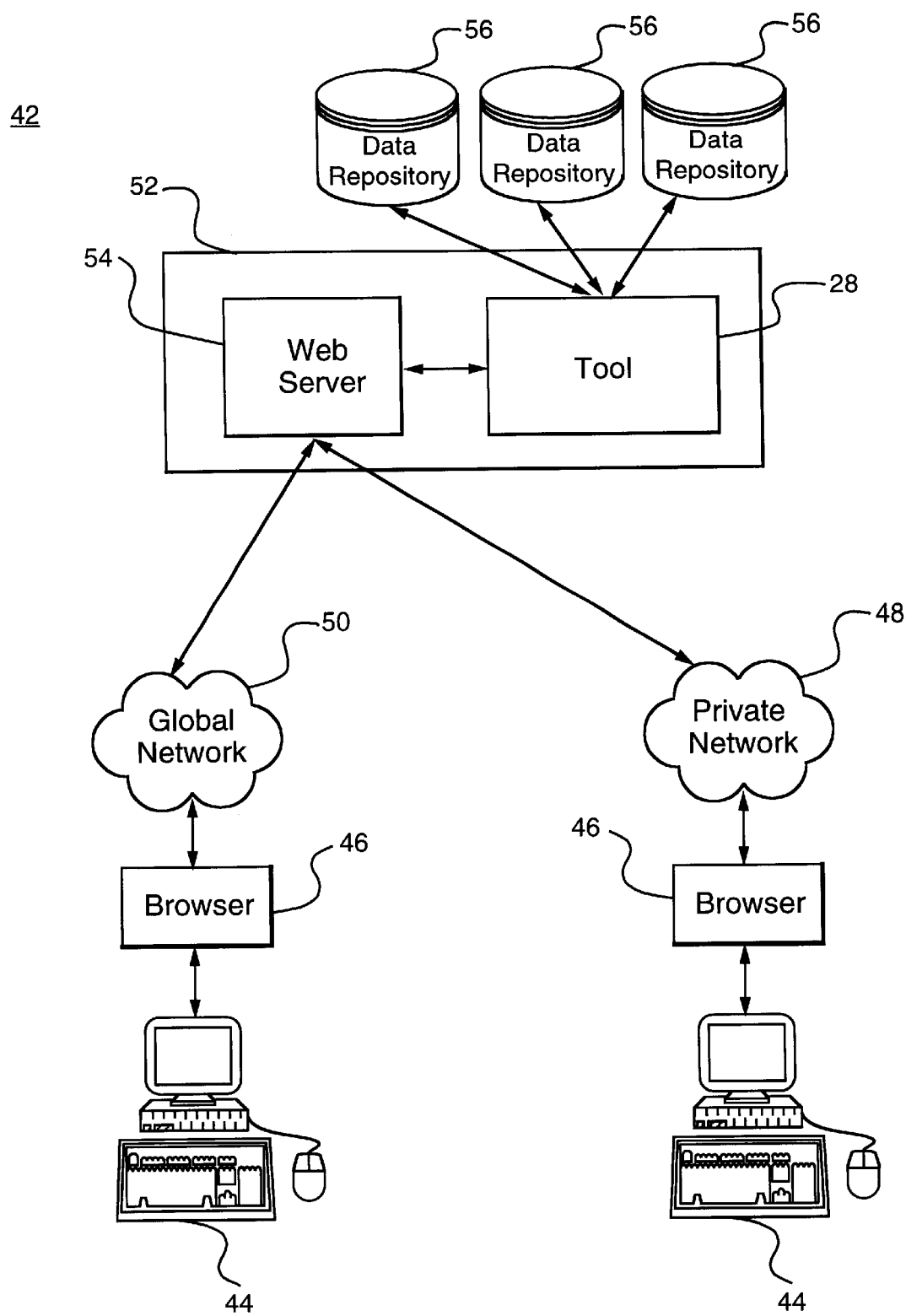
FIG. 3 shows an architectural diagram of a system for implementing the tool that establishes and maintains information needed to manage a community.

FIG. 3 shows an architectural diagram of a system 42 for implementing the tool shown in FIG. 2. FIG. 3 shows that there are several ways of accessing the tool 28. A computing unit 44 allows the SuperAdministrator to access the tool 28. The computing unit 44 can take the form of a hand-held digital computer, personal digital assistant computer, notebook computer, personal computer or workstation. The SuperAdministrator uses a web browser 46 such as Microsoft INTERNET EXPLORER or Netscape NAVIGATOR to locate and display the administration tool 28 on the computing unit 44. A communication network such as an electronic or wireless network connects the computing unit 44 to the tool 28. FIG. 3 shows that the computing units 44 may connect to the tool 28 through a private network 48 such as an extranet or intranet or a global network 50 such as a WAN (e.g., Internet). As shown in FIG. 3, the tool 28 resides in a server 52, which comprises a web server 54 that serves the tool 28 and a data repository 56 (or repositories) that contains the various information associated with the community. However, the tool does not have to be co-resident with the server 52. If desired, the system 42 may have functionality that enables authentication and access control of users accessing the tool 28. Both authentication and access control can be handled at the web server level by the tool 28 itself, or by commercially available packages such as Netegrity SITEMINDER.

The information in the data repository or repositories 56 as mentioned above may comprise community information on users in the community such as their name, location, telephone number, organization, login identification, password, etc. Other information may comprise the user's access privileges to certain resources such as applications and content. The data repository or repositories 56 may also store information on the physical devices (e.g., personal computers, servers, printers, routers, communication servers, etc.) in the networks that support the communities. Additional information stored in the data repository or repositories 56 may comprise the services (e.g., operating systems, applications, shared-file systems, print queues, etc.) available to each of the physical devices. The data repository or repositories 56 may comprise repositories such as directories and databases that have different structures for storing data. Examples of possible data repositories include but are not limited to LDAP directories, relational databases, object-oriented databases, flat files, data management systems and other directory type databases with other types of schema.

Figure 4:
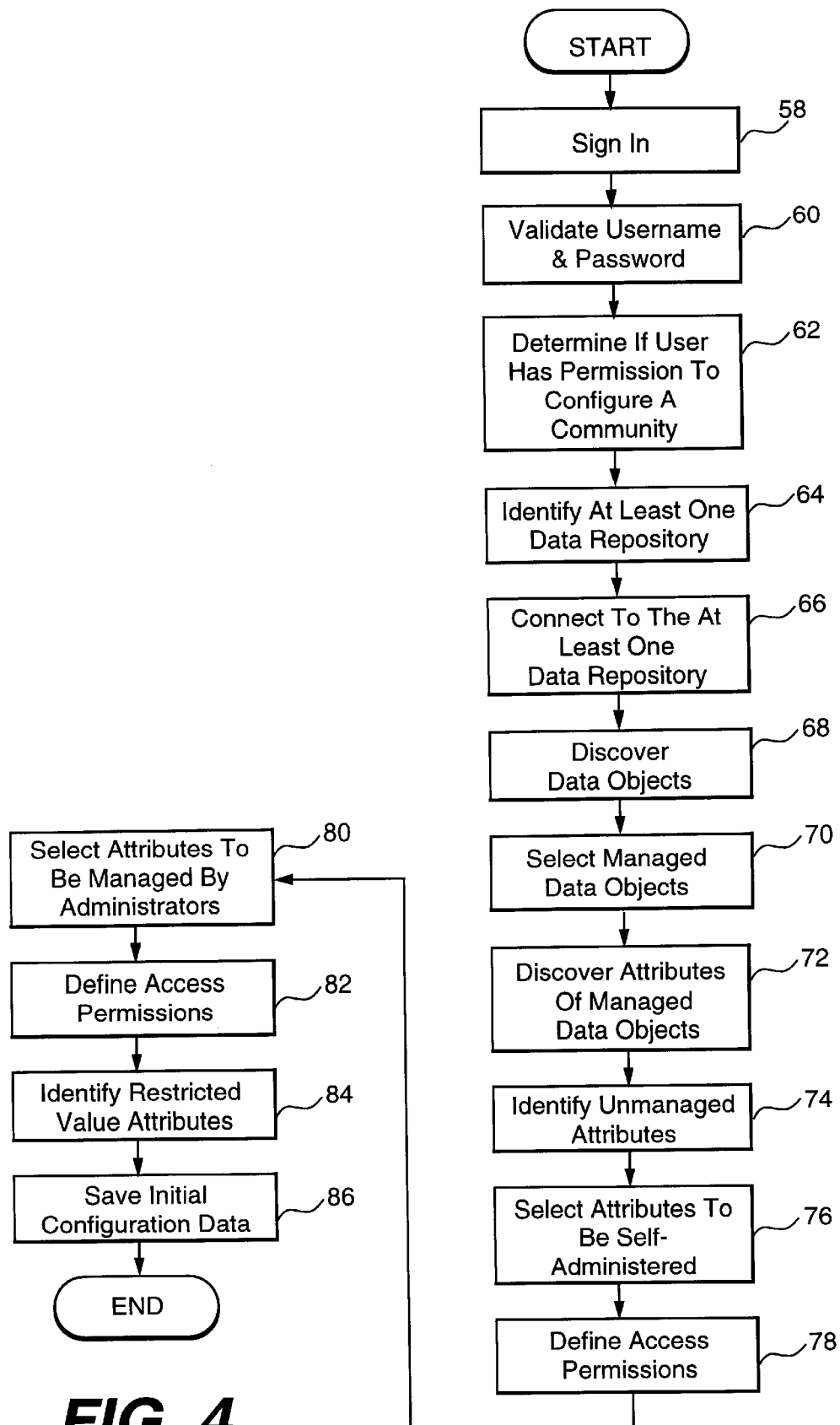
FIG. 4 shows a flow chart describing the acts performed to initially configure administration of a community with the tool shown in FIG. 2.

Using the system 42 shown in FIG. 3, an administrator such as the SuperAdministrator can use the tool 28 to establish and maintain a community such as a user community. FIG. 4 shows a flow chart describing the acts performed to initially configure administration of a community with the tool 28. At block 58, the SuperAdministrator signs in. The sign-in act can include entering identity and security information (e.g., a valid username and password). The tool validates the username and password at 60. The tool then determines if the user has permission (i.e., the user is a SuperAdministrator) to configure a community at 62. If the user is not authenticated or does not have permission to configure a community, then the user is not allowed to configure a community.

At 64, the SuperAdministrator installs the tool and identifies the at least one data repository that contains community information. In the installation, the SuperAdministrator inputs connection information for accessing data stored within the at least one data repository such as server and port information, the identification and password for accessing the at least one repository. Note that the at least one data repository may already exist; in this case the SuperAdministrator simply needs to provide the connection information to the tool. Next, the tool connects to the at least one data repository at 66 to discover the schema. As mentioned above, during this discovery phase, the tool learns what data objects and attributes exist within the at least one data repository. First, at 68, the data objects in the at least one data repository are discovered. Next, the SuperAdministrator selects data objects at 70 that will make up a managed user. The data selection component is then used at 72 to discover attributes on those selected data objects. Next, the data selection component is used to identify attributes that are not managed at 74.

At 76, the SuperAdministrator selects attributes that will be self-administered by a user. As mentioned above, some attributes that can be self-administered may include the user's name, address, telephone number, etc. Next, the SuperAdministrator uses the access permissions component to define access permissions at 78 to define what acts a user can do to the attributes selected for self-administration. At 80, the SuperAdministrator uses the data selection component to select attributes to be managed by administrators and the access permissions component to define how the administrators can and cannot act (e.g., edit, view, delete, etc.) upon the selected attributes at 82.

The SuperAdministrator then identifies attributes that will have restricted values associated therewith at 84. At this block, the SuperAdministrator also assigns allowable values for the attributes that have been identified to have restricted values. All of the initial configuration data are then saved at 86. Once the community has been configured, then an administration tool can administer the community. In particular, the administration tool can be used to set up various domains and sub-domains and grant authority to manage these domains.

Figure 5:
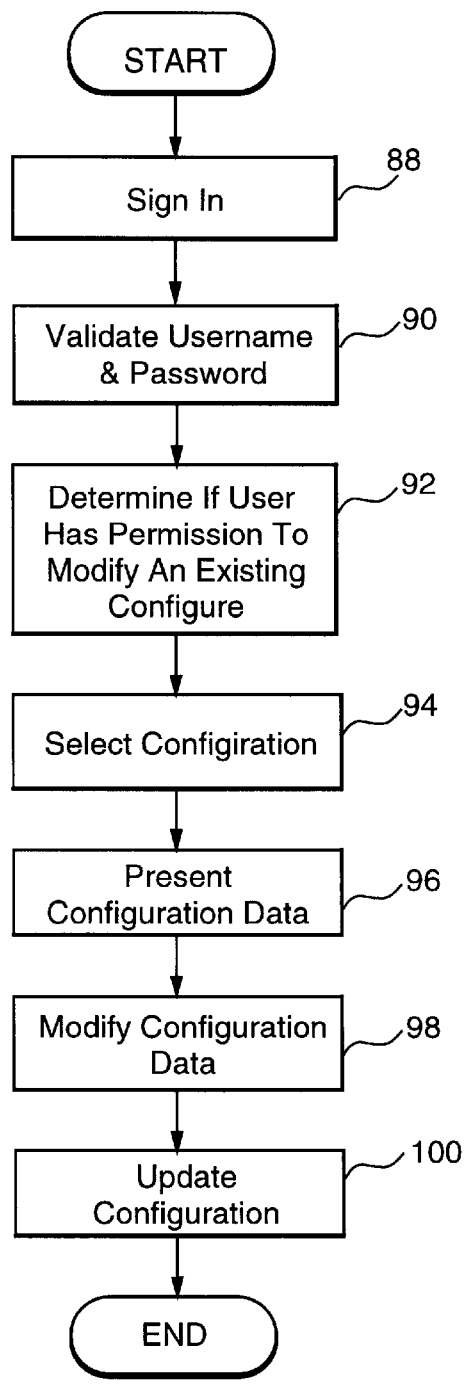
FIG. 5 shows a flow chart describing the acts performed to modify an existing configuration with the tool shown in FIG. 2.

FIG. 5 shows a flow chart describing the acts performed to modify an existing configuration with the tool 28. At block 88, the SuperAdministrator signs in by entering his or her identity and security information (e.g., a valid username and password). The tool validates the username and password at 90 and determines if the user has permission (i.e., the user is a SuperAdministrator) to modify an existing configuration at 92. If the user is not authenticated or does not have permission to configure a community, then the user is not allowed to modify an existing configuration. At 94, the SuperAdministrator selects a particular configuration that he or she would like to modify. The tool then parses the configuration selection, obtains the configuration data and presents it to the SuperAdministrator at 96. Then the SuperAdministrator makes the modifications to the configuration at 98. The modifications could include modifying, adding or removing objects, attributes, access permissions, restricted value attributes, connection information, etc. If any modifications affect the attributes that were designated as unmanaged, then such changes are noted. After making the modifications, the modified configuration data is then updated at 100.

Figure 6:
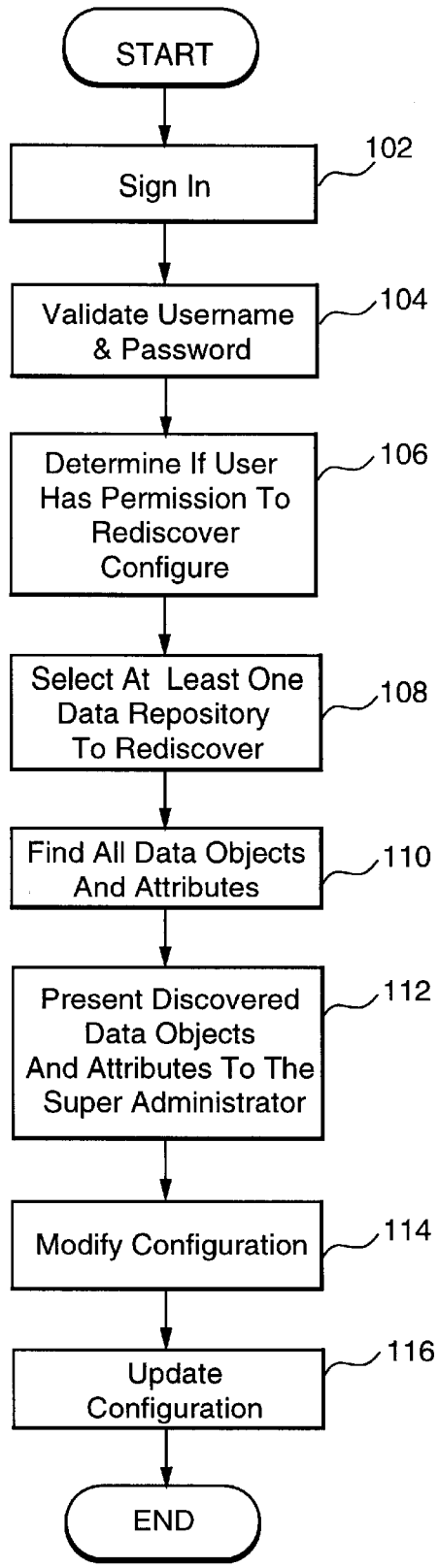
FIG. 6 shows a flow chart describing the acts performed to rediscover data within the at least one data repository with the tool shown in FIG. 2.

FIG. 6 shows a flow chart describing the acts performed during rediscovery of the at least one data repository with the tool 28. At block 102, the SuperAdministrator signs in by entering his or her identity and security information (e.g., a valid username and password). The tool validates the username and password at 104 and determines if the user has permission (i.e., the user is a SuperAdministrator) to rediscover data at 106. If the user is not authenticated or does not have permission to rediscover data, then the user is not allowed to do so. At 108, the SuperAdministrator selects at least one data repository to rediscover. The tool crawls the at least one data repository and finds all data objects and attributes in the at least one data repository at 110 and presents the results to the SuperAdministrator at 112. Then the SuperAdministrator makes any modifications to the configuration at 114 in the manner described with FIG. 5. After making any modifications, the modified configuration data are then updated at 116. Basically, the rediscovery process causes the SuperAdministrator to perform the same steps performed in the initial configuration (e.g., discovering data objects, selecting objects, discovering attributes, selecting attributes, etc.).

Figure 7:
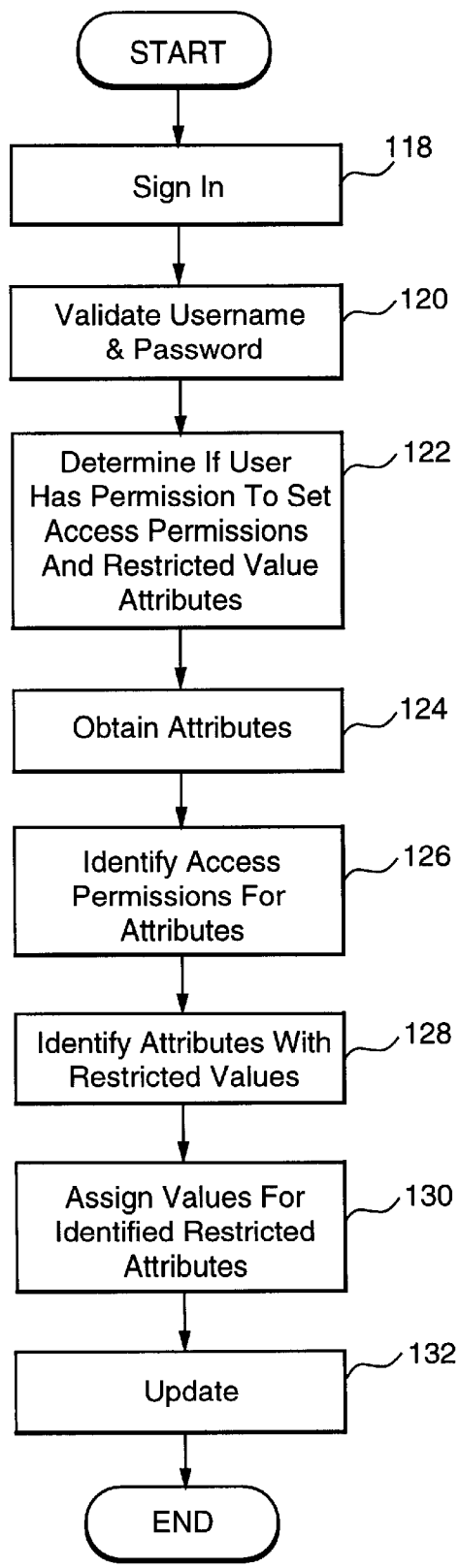
FIG. 7 shows a flow chart describing the acts performed to configure access permissions and restricted value attributes with the tool shown in FIG. 2.

FIG. 7 shows a flow chart describing the acts performed to configure access permissions and restricted value attributes with the tool 28. As mentioned above, the SuperAdministrator can configure access permissions and restricted value attributes during initial configuration or modification of the configuration. At block 118, the SuperAdministrator signs in by entering his or her identity and security information (e.g., a valid username and password). The tool validates the username and password at 120 and determines if the user has permission (i.e., the user is a SuperAdministrator) to set access permissions and restricted value attributes at 122. If the user is not authenticated or does not have permission to set access permissions and restricted value attributes, then the user is not allowed to do so. At 124, the tool obtains the attributes selected by the SuperAdministrator during the configuration. Then the SuperAdministrator identifies access permissions defining what type of operations (e.g., edit, view, delete, etc.) an administrator can and cannot perform on each of the attributes at 126. The SuperAdministrator then identifies attributes that will have restricted values associated therewith at 128. At 130, the SuperAdministrator assigns allowable values for the attributes that have been identified to have restricted values. The selections are then updated at 132.

The foregoing flow charts of this disclosure show the functionality and operation of the tool. In this regard, each block represents a module, segment, or portion of code, which comprises one or more executable instructions for implementing the specified logical function(s). It should also be noted that in some alternative implementations, the functions noted in the blocks may occur out of the order noted in the figures or, for example, may in fact be executed substantially concurrently or in the reverse order, depending upon the functionality involved. Also, one of ordinary skill in the art will recognize that additional blocks may be added. Furthermore, the functions can be implemented in programming languages such as C++ or JAVA; however, other languages can be used.

The above-described tool comprises an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Note that the computer readable medium may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

It is apparent that there has been provided in accordance with this invention, a tool that establishes and maintains a managed community. While the invention has been particularly shown and described in conjunction with a preferred embodiment thereof, it will be appreciated that variations and modifications can be effected by a person of ordinary skill in the art without departing from the scope of the invention.

What is claimed is:

1. A method for establishing information needed to manage a collection of data, comprising:
   identifying at least one data repository containing data related to the collection of data;
   discovering the structure of the data within the at least one data repository;
   selecting data objects and attributes within the at least one data repository to manage from the discovered structure; and
   defining access permissions for managing the selected attributes, wherein the defining of access permissions comprises determining operations that can and cannot be performed on the selected attributes.

2. The method according to claim 1, wherein the identifying of the at least one data repository comprises selecting from data repositories having different structures.

3. The method according to claim 1, wherein the discovering of the structure comprises determining the data objects and attributes that exist within the at least one data repository.

4. The method according to claim 1, further comprising identifying attributes that are unmanaged.

5. The method according to claim 1, wherein the defining of access permissions comprises specifying restricted values for some of the selected attributes.

6. The method according to claim 1, further comprising modifying at least one of the selected data objects and attributes and the defined access permissions.

7. The method according to claim 1, further comprising rediscovering information about the structure of the data within the at least one data repository at a subsequent time.

8. The method according to claim 1, further comprising managing the collection of data according to the selected data objects and attributes and defined access permissions.

9. A method for establishing information needed to manage a community, comprising:
   identifying at least one data repository containing data related to the community;
   discovering the structure of the data within the at least one data repository;
   selecting data objects and attributes within the at least one data repository to manage from the discovered structure; and
   defining access permissions for managing the selected attributes.

10. The method according to claim 9, wherein the identifying of at least one data repository comprises specifying connection information for accessing data stored within the at least one data repository.

11. The method according to claim 9, wherein the discovering of the structure comprises determining the data objects and attributes that exist within the at least one data repository.

12. The method according to claim 9, further comprising identifying attributes that are unmanaged.

13. The method according to claim 9, wherein the defining of access permissions comprises determining operations that can and cannot be performed on the selected attributes.

14. The method according to claim 9, wherein the defining of access permissions comprises specifying restricted values for some of the selected attributes.

15. The method according to claim 9, further comprising modifying at least one of the selected data objects and attributes and the defined access permissions.

16. The method according to claim 9, further comprising rediscovering information about the structure of the data within the at least one data repository at a subsequent time.

17. The method according to claim 16, wherein the rediscovering of information comprises determining the data objects and attributes that exist within the at least one data repository.

18. The method according to claim 17, further comprising selecting new data objects and attributes to manage.

19. The method according to claim 9, further comprising managing the community according to the selected data objects and attributes and defined access permissions.

20. A method for enabling an administrator to establish information needed to manage a community, comprising:
   identifying at least one data repository containing data related to the community;
   discovering the structure of the data within the at least one data repository;
   prompting the administrator select data objects and attributes within the at least one data repository from the discovered structure; and
   prompting the administrator to define access permissions for managing the selected attributes.

21. The method according to claim 20, wherein the identifying of at least one data repository comprises specifying connection information for accessing data stored within the at least one data repository.

22. The method according to claim 20, wherein the discovering of the structure comprises determining the data objects and attributes that exist within the at least one data repository.

23. The method according to claim 20, further comprising prompting the administrator to identify attributes that are unmanaged.

24. The method according to claim 20, further comprising prompting the administrator to modify at least one of the selected data objects and attributes and the defined access permissions.

25. The method according to claim 20, further comprising prompting the administrator to rediscover information about the structure of the data within the at least one data repository at a subsequent time.

26. The method according to claim 20, further comprising enabling the administrator to manage the community according to the selected data objects and attributes and defined access permissions.

27. A method for configuring a community to support an administrative tool, comprising:
   identifying at least one data repository containing data related to the community;
   discovering the structure of the data within the at least one data repository;
   selecting data objects and attributes within that at least one data repository from the discovered structure;
   defining access permissions for managing the selected attributes; and
   using the administrative tool to manage the community according to the selected data objects and attributes and defined access permissions.

28. The method according to claim 27, wherein the identifying of at least one data repository comprises specifying connection information for accessing data stored within the at least one data repository.

29. The method according to claim 27, wherein the identifying of at least one data repository comprises selecting from data repositories having different structures.

30. The method according to claim 27, further comprising identifying attributes that are unmanaged.

31. The method according to claim 27, wherein the defining of access permissions comprises determining operations that can and cannot be performed on the selected attributes.

32. The method according to claim 27, wherein the defining of access permissions comprises specifying restricted values for some of the selected attributes.

33. The method according to claim 27, further comprising modifying at least one of the selected data objects and attributes and the defined access permissions.

34. The method according to claim 27, further comprising rediscovering information about the structure of the data within the at least one data repository at a subsequent time.

35. A tool for establishing information needed to manage a community, comprising:
   a data repository identification component that identifies at least one data repository containing data related to the community;
   a data structure discovery component that discovers the structure of the data within the at least one data repository;
   a data selection component that selects data objects and attributes within that at least one data repository according to the structure discovered by the data structure discovery component; and
   an access permissions component that defines access permissions for managing the attributes selected by the data selection component.

36. The tool according to claim 35, wherein the data repository identification component specifies connection information for accessing data stored within the at least one data repository.

37. The tool according to claim 35, wherein the data repository identification component selects from data repositories having different structures.

38. The tool according to claim 35, wherein the data structure discovery component determines the data objects and attributes that exist within the at least one data repository.

39. The tool according to claim 35, wherein the data selection component identifies attributes that are unmanaged.

40. The tool according to claim 35, wherein the access permissions component determines operations that can and cannot be performed on the selected attributes.

41. The tool according to claim 35, wherein the access permissions component specifies restricted values for some of the selected attributes.

42. The tool according to claim 35, further comprising a modification component that modifies at least one of the selected data objects and attributes and the defined access permissions.

43. The tool according to claim 35, further comprising a rediscovery information component that rediscovers information about the structure of the data within the at least one data repository at a subsequent time.

44. A tool for establishing information needed to manage a community, comprising:
   means for identifying at least one data repository containing data related to the community;
   means for discovering the structure of the data within the at least one data repository;
   means for selecting data objects and attributes within that at least one data repository according to the structure discovered by the discovering means; and
   means for defining access permissions for the managing attributes selected by the selecting means.

45. The tool according to claim 44, wherein the identifying means selects from data repositories having different structures.

46. The tool according to claim 44, wherein the discovering means determines the data objects and attributes that exist within the at least one data repository.

47. The tool according to claim 44, wherein the selecting means identifies attributes that are unmanaged.

48. The tool according to claim 44, further comprising means for modifying at least one of the selected data objects and attributes and the defined access permissions.

49. The tool according to claim 44, further comprising means for rediscovering information about the structure of the data within the at least one data repository at a subsequent time.

50. A system for establishing information needed to manage a community, comprising:
   at least one data repository containing a plurality of community information;
   a tool to establish information in the at least one data repository to manage the community; the tool comprising a data repository identification component that identifies the least one data repository containing data related to the community; a data structure discovery component that discovers the structure of the data within the at least one data repository; a data selection component that selects data objects and attributes within that at least one data repository according to the structure discovered by the data structure discovery component; and an access permissions component that defines access permissions for managing the attributes selected by the data selection component; and
   a first computing unit configured to serve the tool.

51. The system according to claim 50, further comprising a second computing unit configured to execute the tool served from the first computing unit over a network.

52. The system according to claim 50, wherein the data repository identification component specifies connection information for accessing data stored within the at least one data repository.

53. The system according to claim 50, wherein the data repository identification component selects from data repositories having different structures.

54. The system according to claim 50, wherein the data structure discovery component determines the data objects and attributes that exist within the at least one data repository.

55. The system according to claim 50, wherein the data selection component identifies attributes that are unmanaged.

56. The system according to claim 50, wherein the access permissions component determines operations that can and cannot be performed on the selected attributes.

57. The system according to claim 50, wherein the access permissions component specifies restricted values for some of the selected attributes.

58. The system according to claim 50, wherein the tool further comprises a modification component that modifies at least one of the selected data objects and attributes and the defined access permissions.

59. The system according to claim 50, wherein the tool further comprises a rediscovery information component that rediscovers information about the structure of the data within the at least one data repository at a subsequent time.

60. A computer-readable medium storing computer instructions for instructing a computer system to establish information needed to manage a community, the computer instructions comprising:
   identifying at least one data repository containing data related to the community;
   discovering the structure of the data within the at least one data repository;
   selecting data objects and attributes within the at least one data repository; and to manage from the discovered structure; and
   defining access permissions for managing the selected attributes.

61. The computer-readable medium according to claim 60, wherein the identifying of at least one data repository comprises instructions for specifying connection information for accessing data stored within the at least one data repository.

62. The computer-readable medium according to claim 60, wherein the discovering of the structure comprises instructions for determining the data objects and attributes that exist within the at least one data repository.

63. The computer-readable medium according to claim 60, further comprising instructions for identifying attributes that are unmanaged.

64. The computer-readable medium according to claim 60, wherein the defining of access permissions comprises instructions for determining operations that can and cannot be performed on the selected attributes.

65. The computer-readable medium according to claim 60, wherein the defining of access permissions comprises instructions for specifying restricted values for some of the selected attributes.

66. The computer-readable medium according to claim 60, further comprising instructions for modifying at least one of the selected data objects and attributes and the defined access permissions.

67. The computer-readable medium according to claim 60, further comprising instructions for rediscovering information about the structure of the data within the at least one data repository at a subsequent time.

68. The computer-readable medium according to claim 67, wherein the rediscovering of information comprises instructions for determining the data objects and attributes that exist within the at least one data repository.

69. The computer-readable medium according to claim 68, further comprising instructions for selecting new data objects and attributes to manage.

70. The computer-readable medium according to claim 60, further comprising instructions for managing the community according to the selected data objects and attributes and defined access permissions.

71. A computer-readable medium storing computer instructions for instructing a computer system to enable an administrator to establish information needed to manage a community, the computer instructions comprising:
   identifying at least one data repository containing data related to the community;
   discovering the structure of the data within the at least one data repository;
   prompting the administrator to select data objects and attributes within the at least one data repository from the discovered structure; and
   prompting the administrator to define access permissions for managing the selected attributes.

72. The computer-readable medium according to claim 71, wherein the identifying of at least one data repository comprises instructions for specifying connection information for accessing data stored within the at least one data repository.

73. The computer-readable medium according to claim 71, wherein the discovering of the structure comprises instructions for determining the data objects and attributes that exist within the at least one data repository.

74. The computer-readable medium according to claim 71, further comprising instructions for prompting the administrator to identify attributes that are unmanaged.

75. The computer-readable medium according to claim 71, further comprising instructions for prompting the administrator to modify at least one of the selected data objects and attributes and the defined access permissions.

76. The computer-readable medium according to claim 71, further comprising instructions for prompting the administrator to rediscover information about the structure of the data within the at least one data repository at a subsequent time.

77. The computer-readable medium according to claim 71, further comprising instructions for enabling the administrator to manage the community according to the selected data objects and attributes and defined access permissions.

* * * * *